INVENTORS
Ronald L. Bishop
Robert W. Mahland

Oct. 22, 1957  R. L. BISHOP ET AL  2,810,291
GYROSCOPIC INSTRUMENTS
Filed April 10, 1947  3 Sheets-Sheet 3
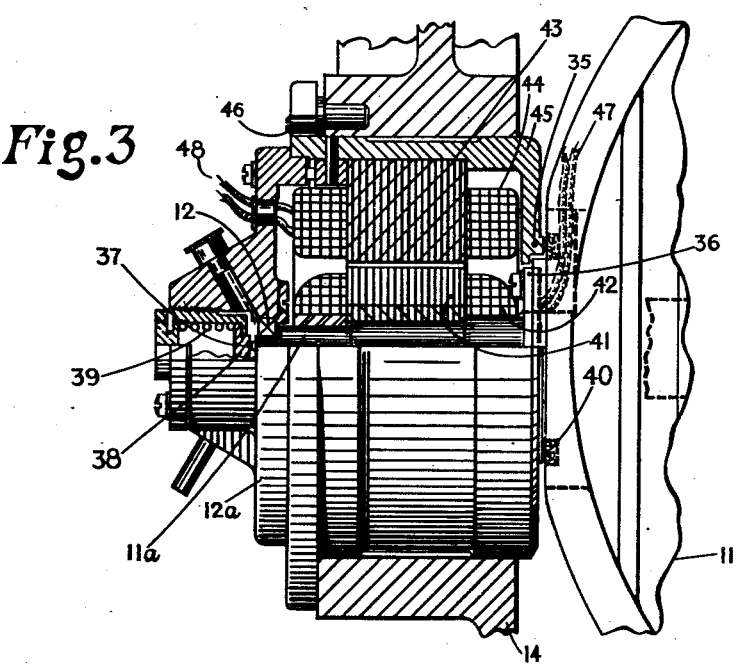
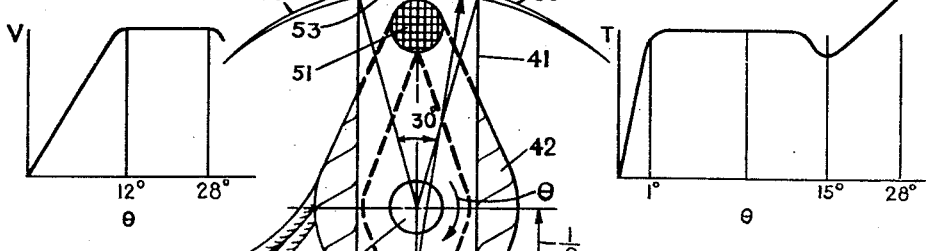
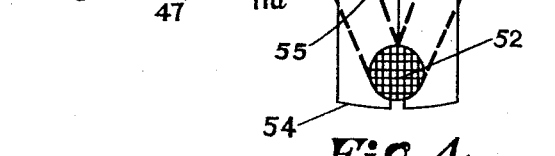
INVENTORS
Ronald L. Bishop
Robert W. Mahland
BY
ATTORNEYS

United States Patent Office 2,810,291
Patented Oct. 22, 1957

2,810,291

GYROSCOPIC INSTRUMENTS

Ronald L. Bishop, Oceanside, and Robert W. Mahland, Brooklyn, N. Y., assignors to American Bosch Arma Corporation Application April 10, 1947, Serial No. 740,634

4 Claims. (Cl. 74—5.4)

This invention relates to gyroscopic instruments, and has particular reference to a torque-motor control mechanism for a gyrocompass, although the invention is not limited to that use.

In copending patent application Serial No. 663,370, filed April 19, 1946, by George Agins, a system of gyroscope control or correction mechanism is described for a gyrocompass in which a sensitive gyroscope is supported about horizontal and vertical axes in a normally stabilized frame mounted on an unstable support, such as a ship, airplane, tank, or other vehicle, and is provided with non-pendulous means imparting direction-seeking properties to the gyroscope. This non-pendulous means consists of a substantially vertical electromagnetic link between the gyroscope and the earth afforded by a motor opposing the tilt of the gyroscope about a horizontal axis and providing a substantially constant increase in tilt reaction torque from zero to approximately one degree of tilt angle, and substantially constant tilt-reaction torque above one degree of tilt. A damping motor is provided on said vertical axis of the gyroscope support and is energized from the tilt-opposing motor, whereby the gyroscope tends to indicate the vertical plane containing the axis about which the supporting vehicle is actually rotating in space, with means provided for applying calculated corrections to the gyroscope about both of its mounting axes, whereby the gyroscope is caused to indicate the vertical plane containing the rotation axis of the earth.

In accordance with the present invention, a gyroscopic instrument, adapted to gyrocompass service is provided, in which an improved form of torque motor affords precession of the gyroscope for purposes similar to those prescribed for the torque motor of said copending application, or for general purposes for which a gyroscope so equipped is adaptable. In a preferred embodiment of the gyroscopic apparatus of this invention, the spinning wheel of the gyroscope is adapted to be precessed by application of torque around at least one axis by a torque motor, having a rotor with a shaft which is an extended flexible trunnion of one gimbal, and is slidably mounted in ballbearings between springs, and having a cooperating stator assembly including a case angularly movable in another gimbal of the mounting, the flexible trunnion and the casing having impact surfaces adapted to come into contact whenever the trunnion is flexed by shock or translated axially. A second torque motor is provided for the opposite flexible trunnion, so that two torque motors are used in the arrangement of the present invention instead of the single torque motor employed in the apparatus disclosed by said copending application.

It will be seen that although particularly adapted for correcting the reading of a gyrocompass, the gyroscope control of this invention may be used for any type of precession control, such as in a rate taker or ship stabilizer, for instance, wherein it acts promptly, accurately, and positively without requiring complicating changes.

For a more complete understanding of the invention, reference may be had to the accompanying drawings, in which:

Fig. 3 is an enlarged elevation, partly in section, of one of the torque motors embodying the invention;

Fig. 4 is an enlarged view of the armature of the torque motor of Fig. 3 showing the arrangement of parts; and, Figs. 5 and 6 are graphs illustrating the action of the invention.

Figure 1:
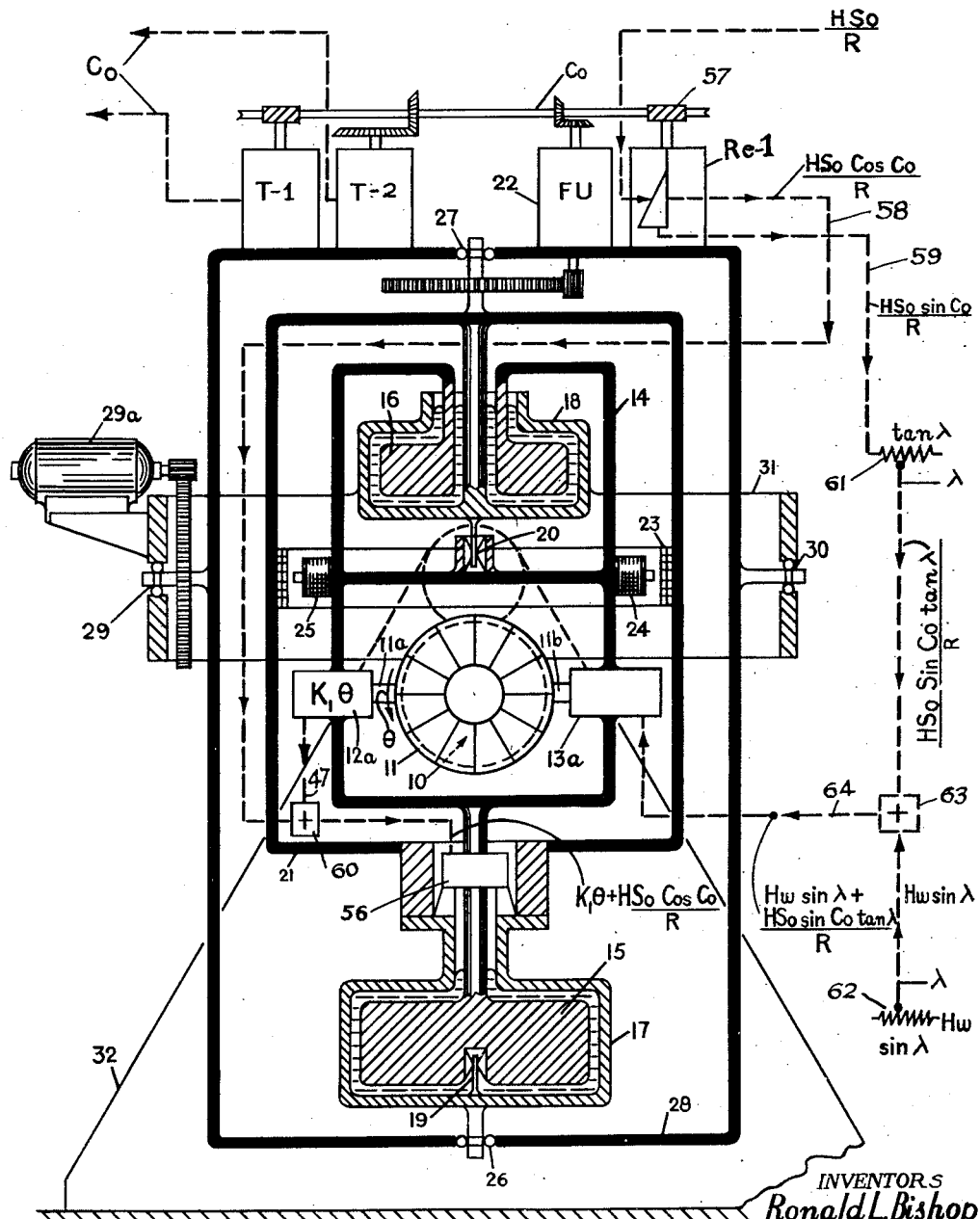
Figure 1 is a semi-diagrammatical view of a gyrocompass assembly on which the invention may be used.

Referring to Fig. 1, there are shown in skeletonized form the essential parts of a gyrocompass, comprising a gyroscope wheel 10 spinning about a horizontal axis on bearings within the casing 11 carried on horizontal small, sensitive ball bearings, one of which is shown at 12 in Fig. 3, within the torque motor 12a, the other bearing being similarly mounted within the opposite torque motor indicated at 13a. The torque motors 12a and 13a are mounted in the sensitive north-indicating frame 14 which is in turn supported by floats 15 and 16 riding in a liquid, preferably mercury, contained in the tanks 17 and 18, respectively.

For guidance transversely, pin and jewel bearings are provided at 19 and 20 coaxially with the vertical flotation axis of sensitive frame 14. The tanks 17 and 18 are carried on the follow-up frame 21 which is caused to accurately follow the sensitive frame 14 by means of the follow-up motor 22 and accompanying gearing, controlled by means of the follow-up coils 23 which are actuated by the alternating-current-powered magnets 24 and 25, in well-known manner. Low-speed and high-speed course angle (Co) may be transmitted to remote points by sensitive transmitters T–1 and T–2 driven from follow-up motor 22 as indicated in Fig. 1.

The follow-up frame 21 is carried on vertical bearings 26 and 27 in vertical frame 28 controlled as to pitch angle by the follow-up motor 29a actuated from a remote vertical determining means, not shown, but which may be of the type shown in copending application Serial No. 607,614, filed July 28, 1945, by George Agins. Pitch frame 28 is carried on horizontal bearings 29 and 30 in horizontal roll frame 31 which in turn is carried by horizontal bearings in the deck-mounted pedestal 32, and is corrected for roll by motive means similar to that shown at 29a but not illustrated.

Figure 2:
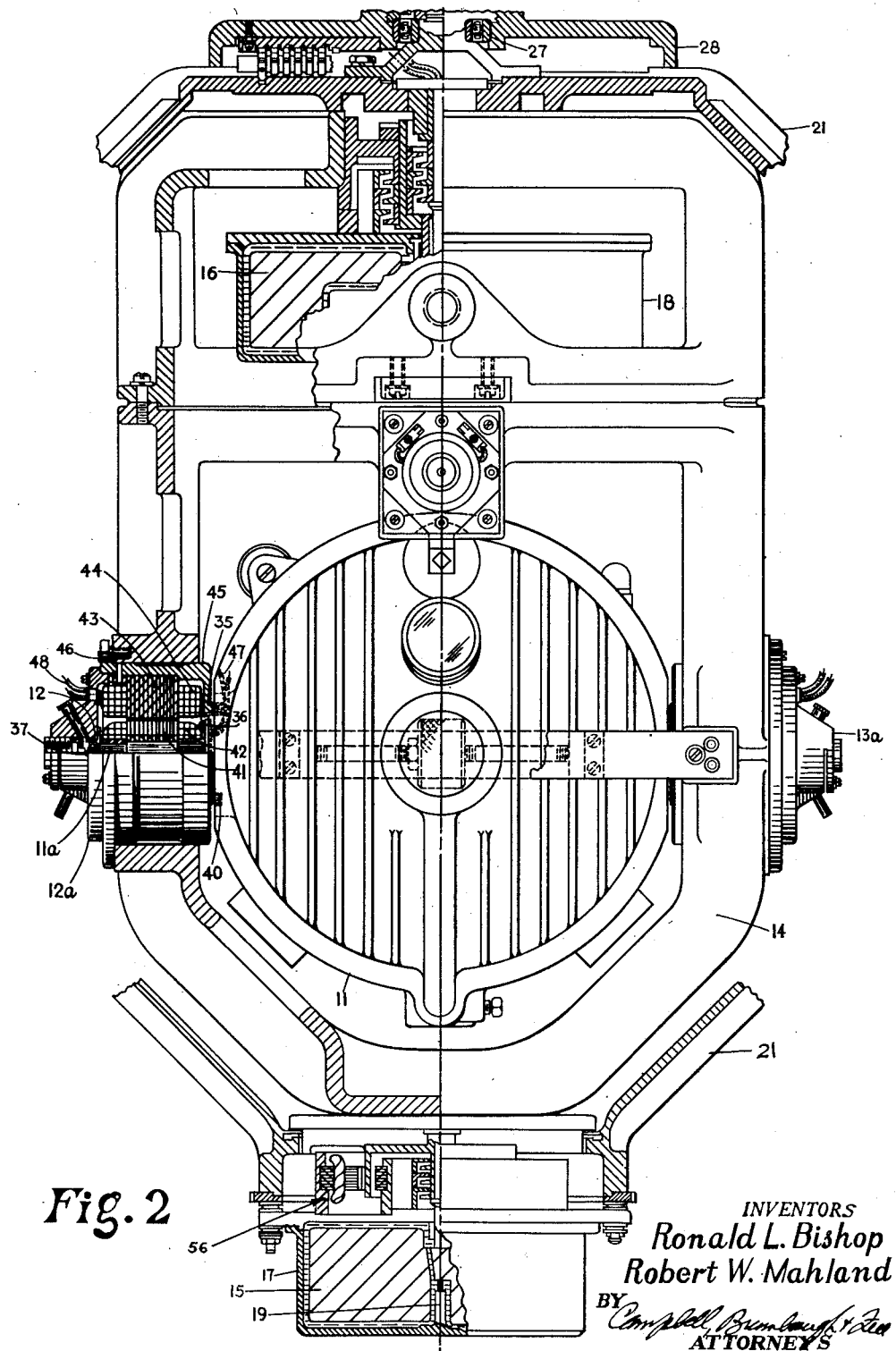
Fig. 2 is a quarter axial section through the sensitive element of the gyrocompass using one form of the improved torque motor.

Fig. 2 illustrates the above-described sensitive assembly in enlarged and more practical form, including the gyroscope casing 11 mounted upon the sensitive north-indicating element 14, like parts being numbered as in Fig. 1, a gravity-simulating torque motor 12a being shown at the left and a correction-applying torque motor 13a being shown at the right of the assembly.

The gravity-simulating torque motor 12a is shown enlarged in Fig. 3, with the upper quarter cut a way to illustrate the interior construction, while Fig. 4 gives a still more enlarged view of the stator and rotor relationship, taken from one end of the same. In these drawings a fragment of the gyroscope casing 11 is shown and seen to have attached permanently to it at the left side a supporting trunnion 11a, carried sensitively in the aforementioned very small and accurate ball-bearing 12.

The small bearing 12 and the similar one in the torque motor 13a at the opposite side of the gyroscope casing 11 are strong enough to carry the steady weight of the gyroscope assembly 10, 11, but are not able to stand shocks such as are experienced in modern warfare and therefore these bearings must be protected from shock. This protection is afforded according to the present invention by parts including trunnion 11a, which is made relatively long and thin as shown in Fig. 3, with the bearing 12 being located near the end of the trunnion 11a, relatively remotely from the mass 11, so that in normal operation the trunnion 11a remains essentially straight but, under heavy acceleration, it will flex and then will recover again after each shock.

Shock abutments are provided, one at 35 on the stator shell 45 of torque motor 12a, as shown in Fig. 3, surrounding the concentric corresponding shoulder on the trunnion at 36. These abutments 35, 36 are closely spaced annularly, so that excessive flexing of trunnions 11a under shock will bring the shoulder 36 and abutments 35 into contact to prevent bending of the trunnion beyond more than the predetermined safe deflection.

Endwise displacement is also limited, the trunnion 11a having a contact ball 37 carried in its end, which nearly touches a hardened and polished disk 38 that is held in its normal position with a predetermined pressure by the spring 39, as shown in Fig. 3. Accordingly, endwise acceleration of the gyroscope 10, 11 to the left, greater than this normal pressure afforded by spring 39, will result in sliding leftwise of casing 11 and trunnion 11a through the bearing 12 against the resistance of spring 39, this arrangement preventing breakage or distortion of the delicate parts during the large endwise shocks which are experienced in warfare. A cushion ring of dense rubber, or other resilient material, may be mounted on the gyroscope casing 11 at 40 for cooperation with abutment 35, to decrease the impact effect of such endwise acceleration, if desired. After the shock has passed, the spring 39 and the natural resilience of the trunnion will break any contact between shoulder 36 and abutment 35 and cushion 40, so that the gyroscope is again free in the sensitive trunnion bearings, of which one is shown at 12.

It will be understood that the right-hand trunnion 11b, housed within torque motor housing 13a is constructed and arranged in the same way.

Advantage is taken of the space provided by the relatively great length of the trunnions 11a and 11b to locate the stator and rotor assemblies of the torque motors 12a and 13a, thus providing a practical and very compact shock-proof torque control system for the sensitive gyroscope 10—11. To this end, the cylindrical stator shell 45 of the left-hand torque motor 12a is mounted on the sensitive frame 14 and thus surrounds the elongated trunnion 11a.

The stator shell 45 is held to the sensitive member 14 by screws, not shown, and is angularly adjustable relatively thereto by means of the eccentric 46. The stator laminations 43 and stator winding 44 are mounted within shell 45, whereas the rotor laminations 41 and rotor winding 42 mounted in slots 51, 52 (Fig. 4) are fixed on trunnion 11a, so as to rotate relatively to the stator assembly 43, 44, 45, when the gyroscope 10—11 tilts. Wires 48 feed the stator winding 44 from a current regulating circuit so that the flux produced by the stator will provide particular torque requirements, and wires 47 lead from rotor winding 42 for a purpose to be described.

The torque motor 12a is so constructed and arranged that it may act as an earth link for correcting the gyroscope in accordance with a known phenomenon, as is explained in said copending application Serial No. 663,370. The design shown is a two-pole torque motor but it will be understood that four or more poles may be employed, according to the same principle. It can be shown that the instantaneous torque developed in the torque motor 12a is $$T = \frac{1}{2} i^2 \frac{dL}{d\theta}$$

where

T is the instantaneous developed torque
$i$ is the instantaneous current in the stator winding 44
L is the inductance of the stator windings 44
$\theta$ is the angular displacement of the rotor 41 from the position of equilibrium
$\frac{dL}{d\theta}$ is the change in inductance of stator per unit angle of displacement of rotor When an alternating current voltage is applied to the stator windings, the average torque developed by the torque motor 12a is $$T\text{ave.} = \frac{E^2}{2(R^2 + \omega^2 L^2)} \frac{dL}{d\theta}$$

where

Tave. is the average developed torque
E is the R. M. S. voltage impressed on the stator windings
R is the effective alternating current resistance of the stator windings for any given displacement of the rotor
$\omega$ is $2\pi$ times the frequency of the voltage impressed on the stator windings
L is the effective inductance of the stator windings for the same given displacement of the rotor In order to obtain the desired torque characteristics, the geometry of the air gap must be controlled so as to cause the inductance values and variations of inductance to be in accordance with the above equation. This condition for torque motor 12a is accomplished by the pole pieces of the stator, the top one being shown at 49 in Fig. 4, which have a concentric face and a width which is a function of the air gap, the diameter of the rotor 41, and the maximum value of the torque to be developed. The width of the face of the stator pole piece intercepts an angle of 30° on the circle 50—50 concentric with the center of the trunnion 11a, as shown in Fig. 4.

The rotor of torque motor 12a has a special form in that its faces 53 and 54, presented to the stator pole faces 49, are not concentric therewith but circular about displaced centers, one of which is shown at 55 in Fig. 4, and is located, to scale, one-half inch below the center of the trunnion 11a. The width of the rotor pole face is the same as the stator pole face. By this unique arrangement, when the trunnion 11a is rotated from its normal position because of the tilt which accompanies a displacement of the gyroscope 10—11 from the meridian, the resisting torque produced on the trunnion 11a increases, as shown in Fig. 5, uniformly up to a tilt, $\theta$, of one degree and, beyond that tilt, remains constant up to almost fifteen degrees. Also, the voltage induced in coil 42 is zero in the upright position of the armature shown in Fig. 4 and increases with angular displacement, as illustrated in Fig. 6 of the drawings, and is fed to damping torque motor 56, operating about the vertical axis of frame 14, as shown in Figs. 1 and 2.

The right-hand torque motor 13a, indicated in Figs. 1 and 2, is an ordinary two-phase induction motor having two stator windings in space quadrature, and an armature of iron and copper alloy, so that the introduction of a correcting voltage to one winding of the stator, and the constant quadrature voltage applied to the other winding of the stator, function to produce a torque which is proportional to the magnitude of the correcting voltage. This applies torque to the gyroscope 10—11 about the horizontal or tilt axis to correct the north indication of the gyroscope, as is well understood.

The functioning of the correcting system including torque motors 12a and 13a is substantially the same as that described in said copending application Serial No. 663,370, and the correction values indicated to the right of Fig. 1 are the same and are similarly applied in the present invention, the principal difference, in so far as application of the corrections is concerned, being that they are applied with two torque motors, 12a and 13a, in the present invention, whereas the mechanism disclosed in said application utilizes but one torque motor.

Although the mode of calculating and applying the corrections indicated in Fig. 1 is explained in detail in said copending application, to which reference may be had, it will be briefly described for convenience, the same characters being used, however, so that comparison will be simplified in case more detailed information is required from said application.

Referring to Fig. 1, the output of follow-up motor 22 is the course (Co) of the mounting vehicle and, through gearing 57 rotates the rotor of an induction resolver R$e$-1 of well-known construction having two stator windings in space quadrature and two rotor windings similarly arranged, so that the voltage input to one or both of the stator windings results in voltages induced in the rotor windings proportional to trigonometric functions of the angle through which the rotor is rotated. The triangle shown at R$e$-1 simply exemplifies this. The stator winding of the resolver R$e$-1, being energized by a voltage proportional to the product of the angular momentum (H) of the gyroscope wheel 10 and the linear speed (So) of the mounting vehicle, divided by the radius of the earth (R), or $$\frac{HSo}{R}$$

fed from external source, and the rotor winding being rotated through the course angle (Co), results in the development in one rotor winding of a voltage proportional to $$\frac{HSo \cos Co}{R}$$

and in the other rotor winding a voltage proportional to $$\frac{HSo \sin Co}{R}$$

as indicated by the output lines 58 and 59 in Fig. 1.

The first of these voltages, $$\frac{HSo \cos Co}{R}$$

is fed by wires 58 and added at 60 to that fed by wires 47 and from rotor coil 42 of torque motor 12a, being that induced therein and proportional to the tilt angle $\theta$, multiplied by the instrument constant $K_1$, or $K_1\theta$, and the sum applied to the stator of damping torque motor 56. The $K_1\theta$ component of this voltage is applied to the damping torque motor 56 to damp the swing of the frame 21, and the $$\frac{HSo \cos Co}{R}$$

component of this voltage is applied to the damping torque motor, to balance the deviation tendency of the compass from the predictable source usually called "north-steaming error."

The voltage proportional to $$\frac{HSo \sin Co}{R}$$

on line 59 energizes the winding of electrical tangent cam 61 whose brush is adjusted in accordance with the latitude ($\lambda$) of the mounting vehicle, so that the voltage output of the electrical tangent cam 61 is $$\frac{HSo \sin Co \tan \lambda}{R}$$

At the same time the brush of electrical sine cam 62 is adjusted according to latitude ($\lambda$) and its winding energized with a voltage proportional to the product of the angular momentum (H) of the gyroscope wheel 10 and the angular velocity ($w$) of the earth's rotation, so that the output of electrical sine cam 62 is a voltage proportional to $Hw \sin \lambda$, which is added at 63 to the output of electrical tangent cam 61, or $$\frac{Hw \sin \lambda + HSo \sin Co \tan \lambda}{R}$$

The first term of this expression will be recognized as the correction for the change in the linear velocity for any position on the earth due to change in latitude, and the second term as corresponding to the E–W "steaming" error of the compass. The corresponding voltage is applied at 64 to the stator of the right-hand torque motor 13a to apply a torque to the gyroscope 10—11 about the horizontal or tilt axis to correct the north indication of the gyroscope.

The operation of the gyroscope control mechanism of this invention may be summarized as initiated by the response of the torque motor 12a to a departure of the gyroscope spin axis from meridian and the accompanying tilt of the gyroscope 10—11 through angle $\theta$ about the axis of trunnion 11a, this response resulting in the application of a torque on the trunnion 11a proportional to the tilt angle $\theta$ between rotor armature 41 and stator pole pieces 49, whose windings 44 are energized by the aforementioned current regulating circuit in order to obtain the flux required. This torque has the effect, as is well known, of causing the gyroscope to precess back and slightly beyond the meridian again. However, voltage simultaneously is induced in rotor coil 42 and transmitted by wires 47 to the damping torque motor 56 for damping the overswing of frame 21, as previously described.

Under normal operating conditions, a well stabilized compass would not depart from the meridian to such a degree so as to cause a tilt of the gyroscope wheel axis of more than one degree, hence increase of the correcting torque is not had beyond one degree. This limitation of correcting torque is advantageous in minimizing the cause for intercardinal rolling error when the compass is caused to function without stabilization of the rings 28 and 31 shown in Fig. 1. Inasmuch as the application of the intercardinal error forces increases directly with the angle of the overswing of the gimbal rings, and if the correcting torque was permitted to increase directly with the relative displacement of the torque motor rotor, the intercardinal error would increase directly as the square of the angle of overswing. By restricting the maximum torque of the torque motor to unity, the intercardinal rolling error can increase only as the first power of the angle of overswing when the compass is unstabilized. By means of this invention, as shown by the curves of Figs. 5 and 6, inaccuracy in stabilization is not serious and the errors will not be too great even if stabilization actually fails and gravity is relied on for stabilization, which, of course, is desirable in a battle compass.

Although a preferred embodiment of the invention has been illustrated and described herein, it will be understood that the invention is not limited thereby, but is susceptible to changes in form and detail within the scope of the following claims.

We claim:

1. In gyroscopic apparatus, including a gyroscope, a support and means for mounting said gyroscope on said support for movement about an axis, the combination of electrical motive means responsive to relative tilting of said gyroscope about said axis for exerting a restoring torque on said gyroscope, said motive means including stator and rotor members relatively rotatable about said axis during a tilt, an exciting winding for one of said members for inducing a voltage in the other member, nonconcentric curved cooperating pole faces on said stator and rotor respectively, whereby relative rotation of said rotor member causes opposing torque about said axis which increases uniformly through a predetermined angle of relative rotation and thereafter remains constant during rotation exceeding said angle, and electrical motive means responsive to said induced voltage for exerting a damping torque about another axis of said mounting means.

2. In gyroscopic apparatus, including a gyroscope, a support and means for mounting said gyroscope on said support for movement about an axis, the combination of electrical motive means responsive to relative tilting of said gyroscope about said axis for exerting a restoring torque on said gyroscope, said motive means including a stator and rotor members relatively rotatable about said axis during a tilt, an exciting winding on said stator for inducing a voltage in the rotor, a pole piece on said stator having a pole face concentric with said axis, a pole piece on said rotor having a pole face having a greater radius of curvature than that of the cooperating stator pole face, whereby relative rotation of said rotor member causes opposing torque about said axis which increases uniformly through a predetermined angle of relative rotation and thereafter remains constant during rotation exceeding said angle, and electrical motive means responsive to said induced voltage for exerting a damping torque about another axis of said mounting means.

3. In gyroscopic apparatus, subject to unpredictable shocks or accelerations, the combination of a support, a frame mounted thereon, a gyroscope mounted in said frame for freedom about at least two axes, an extended flexible trunnion, a bearing slidably mounting said trunnion on one of said axes, electrical motive means including rotor and stator members respectively mounted on said trunnion and said frame, and abutments on said trunnion and stator members for limiting the relative movement between them when the trunnion is flexed or translated axially, in response to said shocks or accelerations, said rotor having an armature with curved pole faces, said stator having an excited winding and curved pole faces cooperating with said rotor pole faces, said sets of curved pole faces being relatively non-concentric, whereby rotation of said rotor causes opposing torque which increases uniformly through a small angle of rotation and thereafter remains constant through a much larger angle of rotation of said rotor.

4. In gyroscopic apparatus including a gyroscope, a support and means for mounting said gyroscope on said support for movement about an axis, the combination of electrical motive means responsive to relative tilting about said axis for exerting a restoring torque on said gyroscope, said motive means including stator and rotor members relatively rotatable about said axis during a tilt, an exciting winding on at least one of said members for inducing a voltage in the other member, non-concentric, curved cooperating pole faces on said stator and rotor, respectively, and having a width of about 30° of a circle concentric with said axis, whereby relative rotation of the rotor member results in the generation of a torque about said axis which increases substantially uniformly up to a tilt of approximately 1° and remains substantially constant beyond that degree up to approximately 15°, and electrical motive means responsive to said induced voltage for exerting a damping torque about another axis of said mounting means.

References Cited in the file of this patent
UNITED STATES PATENTS

| | | |
|---|---|---|
| 1,228,061 | Schuler | May 29, 1917 |
| 1,973,042 | Boykow | Sept. 11, 1934 |
| 2,384,005 | Bell | Sept. 4, 1945 |
| 2,418,032 | Jewell | Mar. 25, 1947 |
| 2,468,113 | Russ | Apr. 26, 1949 |
| 2,486,897 | Wendt | Nov. 1, 1949 |